UNITED STATES PATENT OFFICE.

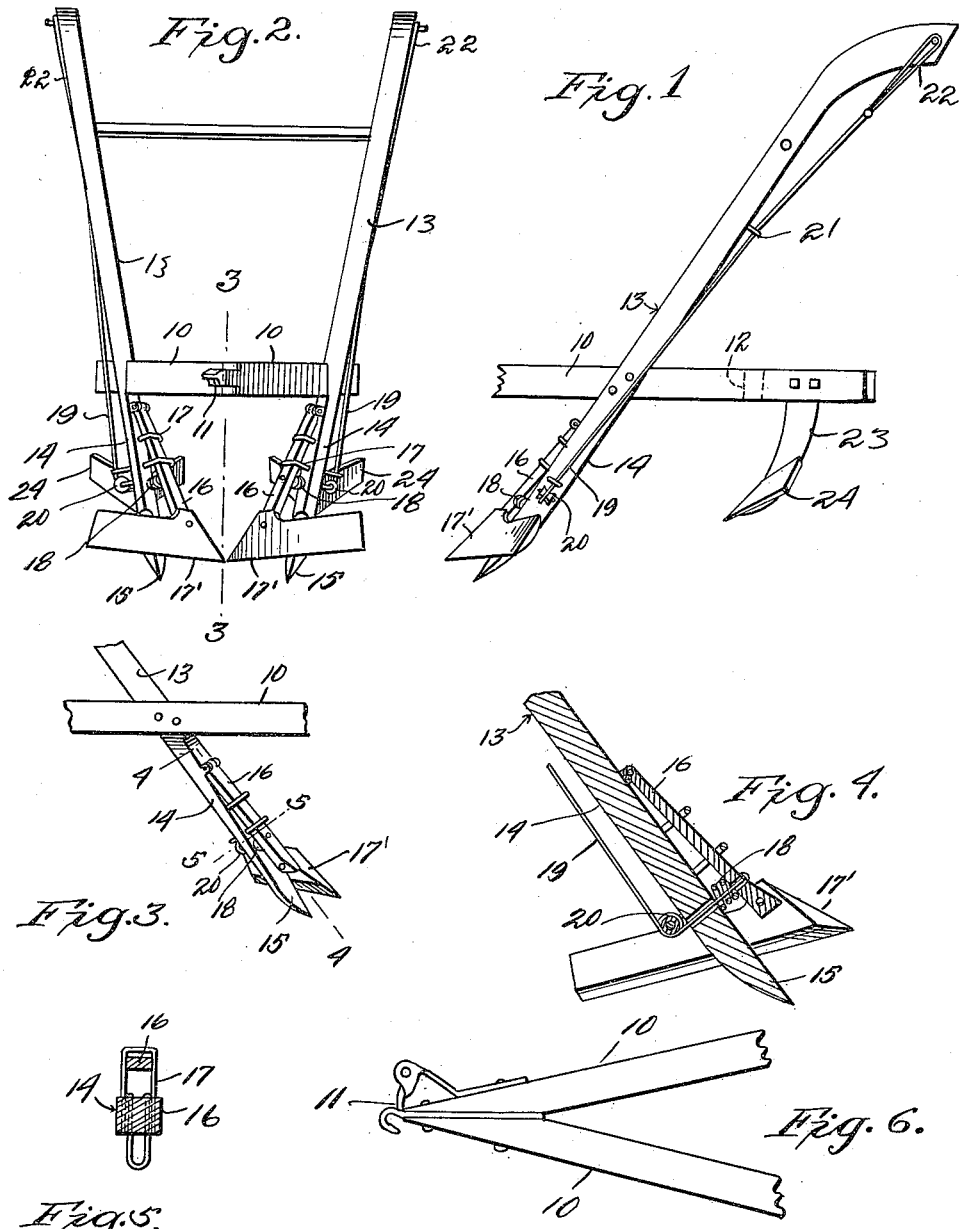

OTTO B. ELKINS, OF ABBEVILLE, GEORGIA, ASSIGNOR OF ONE-HALF TO C. S. CLEMENTS, OF ROCHELLE, GEORGIA.

COTTON-CHOPPER.

1,165,162.  Specification of Letters Patent.  Patented Dec. 21, 1915.

Application filed July 7, 1915. Serial No. 38,475.

*To all whom it may concern:*

Be it known that I, OTTO B. ELKINS, a citizen of the United States, residing at Abbeville, in the county of Wilcox, State of Georgia, have invented certain new and useful Improvements in Cotton-Choppers; and I do hereby declare the following to be a full, clear, and exact description of the invention, such as will enable others skilled in the art to which it appertains to make and use the same.

This invention relates to improvements in cotton choppers.

One object of the invention is to provide a simple device which can be driven down through the row of plants and which can be quickly and easily operated so as to chop out certain of the plants and leave others standing.

Another object is to provide a device of this character which will be easy of operation to chop out the plants, as desired and which will cultivate the soil around the plants at the same time.

A further object is to provide novel chopping elements and the means for conventionally operating the same to withdraw them when it is desired that they do not chop.

Other objects and advantages will be apparent from the following description when taken in connection with the accompanying drawing.

In the drawing: Figure 1 is a side elevation of a cotton chopper made in accordance with my invention, Fig. 2 is a front elevation thereof, Fig. 3 is a vertical section on the line 3—3 of Fig. 2, Fig. 4 is a vertical section on the line 4—4 of Fig. 3, Fig. 5 is a horizontal section on the line 5—5 of Fig. 3, and Fig. 6 is a plan view of the forward portions of the beams.

Referring particularly to the accompanying drawing, 10 represents a pair of forwardly converging beams to the forward connected ends of which there is secured a draft clevis 11. Between the rear portions of the beams is a spacing bar 12, and secured to the sides of the rear portions of the beams are the vertical handles 13. These handles extend downward below the beams to form the standards 14, the lower ends of which are formed with the ground piercing points 15.

Hinged on the inner side of each of the standards and near the upper end is a downwardly extending arm 16, suitable guide members 17 being mounted on the standard and receiving the said arms therethrough. On the lower end of each of the arms 16 is a chopping blade 17', the same being disposed transversely of the lower end of the arm with its point directed forwardly and inwardly. Between the arms and the standard is a spring 18, the ends of which are connected respectively to the standard and arms. Secured to the arm and extending through the spring and through the standard is a cord 19, said cord passing over a pulley 20 mounted on the outside of the standard and extending upwardly through suitable guides 21 on the handles and terminating at the hand grips of the handles where they are provided with suitable loops 22. Carried by the beams in rear of the handles are the standards 23 which carry the sweeps 24 this being adapted for digging up the soil at the sides of the row and for throwing the chopped out plants out of the row.

Normally, the springs swing the members 16 outwardly against the guides 17. In this position the points of the blades 17' meet at a point intermediate the lower ends of the standards. The operator grasps the loops 22 of the cords or wires 19 and pulls upwardly so as to draw the points 17' away from each other and produce an open space between the standards. The device is then driven down a row of standing plants with the standards straddling the row. When the device reaches a point where a plant is to be removed, the operator lets down on either or both of the cords to permit the points to come together and dig out the plant which the operator desires to remove. The points are then drawn apart by upward pull on the cords until the operator sees another plant which he desires to dig out. Thus the operator can dig out any of the successive or alternate plants that he desires. The springs automatically move the points toward each other when the cords are allowed to move down.

What is claimed is:

1. In a cotton chopper, a frame, standards carried by the frame and extending thereabove to form handles, pivoted members mounted on the standards below the frame, chopping blades mounted on the pivoted members and movable toward and away from a point intermediate and forwardly of the standards, means for resiliently holding the pivoted members in their outermost positions, and flexible elements connected to the pivoted members and extending upwardly along the handles within convenient reach whereby the pivoted members are capable of movement toward and away from each other to move the chopping blades into and out of chopping position.

2. In a cotton chopper, a frame having standards, members pivotally connected adjacent the upper end of the standards, springs disposed beneath the pivoted members and bearing thereagainst and against the standards, guides mounted on the standards, grooved rollers carried by the standard, chopping blades carried by the lower ends of the pivoted members, and flexible elements connected to the pivoted members and extending around the pulleys upwardly to points within reach of the operator.

3. In a cotton chopper, a pair of standards, spring-pressed pivoted members mounted on the standards, and carrying on their lower ends chopping blades, each of which is formed with an inwardly extending point and an upwardly extending sweep blade and means for moving the pivoted members to swing the points of the blades toward and away from each other.

In testimony whereof, I affix my signature, in the presence of two witnesses.

OTTO B. ELKINS.

Witnesses:
A. D. MILLER,
J. N. CLARK.

Copies of this patent may be obtained for five cents each, by addressing the "Commissioner of Patents, Washington, D. C."